United States Patent
Kamada (10) Patent No.: US 10,053,187 B2
(45) Date of Patent: Aug. 21, 2018

(54) BICYCLE REAR SPROCKET ASSEMBLY AND BICYCLE REAR SPROCKET

(71) Applicant: SHIMANO INC., Sakai (JP)

(72) Inventor: Kenji Kamada, Sakai (JP)

(73) Assignee: SHIMANO INC., Sakai (JP)

( * ) Notice: Subject to any disclaimer, the term of this patent is extended or adjusted under 35 U.S.C. 154(b) by 200 days.

(21) Appl. No.: 15/204,957

(22) Filed: Jul. 7, 2016

(65) Prior Publication Data
US 2018/0009505 A1    Jan. 11, 2018

(51) Int. Cl.
F16H 55/12    (2006.01)
F16H 55/30    (2006.01)
B62M 9/10    (2006.01)

(52) U.S. Cl.
CPC .............. B62M 9/10 (2013.01); F16H 55/30 (2013.01)

(58) Field of Classification Search
CPC . B62M 9/10; B62M 9/12; F16D 41/30; B60B 27/023; B60B 27/026
USPC ........................................................ 474/160
See application file for complete search history.

(56) References Cited

U.S. PATENT DOCUMENTS

| | | | | |
|---|---|---|---|---|
| 4,145,095 A * | 3/1979 | Segawa | ................ | B60B 27/023 192/64 |
| 4,182,194 A * | 1/1980 | Tomozawa | ................ | B62L 5/06 188/26 |
| 4,278,265 A * | 7/1981 | Nagano | ................ | B60B 27/023 280/160.1 |
| 4,299,318 A * | 11/1981 | Segawa | ................ | B62M 9/10 192/64 |
| 4,324,323 A * | 4/1982 | Campagnolo | ........... | F16D 41/30 192/64 |
| 4,580,670 A * | 4/1986 | Nagano | ................ | B60B 27/023 192/46 |
| 4,816,013 A * | 3/1989 | Kapela | ................ | B62M 9/10 474/160 |
| 4,828,537 A * | 5/1989 | Jourdain | ................ | B62M 9/10 29/892.1 |
| 4,869,710 A * | 9/1989 | Iwasaki | ................ | B62M 9/10 474/160 |
| 5,324,100 A * | 6/1994 | James | ................ | B62M 9/12 192/64 |
| 5,480,357 A * | 1/1996 | Liang | ................ | B62M 9/10 474/160 |
| 5,704,859 A * | 1/1998 | Feng | ................ | B62M 9/10 474/160 |

(Continued)

Primary Examiner — Henry Y Liu
(74) Attorney, Agent, or Firm — Mori & Ward, LLP (57) ABSTRACT

A bicycle rear sprocket assembly comprises a first sprocket. The first sprocket includes a first sprocket body, a plurality of first sprocket teeth, a bearing unit mounting section, and a first torque-transmitting structure. The plurality of first sprocket teeth extend radially outwardly from a first radially outer periphery of the first sprocket body with respect to a rotational center axis. The bearing unit mounting section is at least partly provided to a first radially inner periphery of the first sprocket body. The first torque-transmitting structure is configured to transmit pedaling torque to a second sprocket separately disposed adjacent to the first sprocket without another sprocket between the first sprocket and the second sprocket. The first torque-transmitting structure is provided to a first bicycle inbound facing surface and is a separate member from the second sprocket.

21 Claims, 8 Drawing Sheets

(56) References Cited

U.S. PATENT DOCUMENTS

| | | | | |
|---|---|---|---|---|
| 5,788,593 A * | 8/1998 | Tiong | B62M 9/10 | 474/160 |
| 5,935,034 A * | 8/1999 | Campagnolo | B62M 9/10 | 474/160 |
| 6,123,635 A * | 9/2000 | Farmos | B62M 1/28 | 280/252 |
| 6,264,575 B1 * | 7/2001 | Lim | B62M 9/10 | 192/64 |
| 6,382,381 B1 * | 5/2002 | Okajima | B60B 1/0215 | 192/64 |
| 6,923,741 B2 * | 8/2005 | Wei | B62M 9/10 | 474/152 |
| 7,011,592 B2 * | 3/2006 | Shahana | B62M 9/10 | 474/152 |
| 7,044,876 B2 * | 5/2006 | Kamada | B60B 27/026 | 29/893 |
| 7,351,171 B2 * | 4/2008 | Kanehisa | B60B 27/026 | 301/111.02 |
| 7,585,240 B2 * | 9/2009 | Kamada | B62M 9/10 | 474/148 |
| 7,871,347 B2 * | 1/2011 | Kamada | B62M 9/10 | 474/152 |
| 7,931,553 B2 * | 4/2011 | Tokuyama | B62M 9/10 | 474/144 |
| 7,959,529 B2 * | 6/2011 | Braedt | B62M 9/10 | 474/160 |
| 8,197,371 B2 * | 6/2012 | D'Aluisio | B62M 9/12 | 301/110.5 |
| 8,696,503 B2 * | 4/2014 | Oishi | B62M 9/10 | 474/160 |
| 8,821,330 B2 * | 9/2014 | Dal Pra' | B62M 9/10 | 474/160 |
| 8,905,878 B2 * | 12/2014 | Loy | B62M 9/10 | 474/160 |
| 8,968,130 B2 * | 3/2015 | Liao | B62M 9/10 | 474/160 |
| 2012/0309572 A1 * | 12/2012 | Braedt | B62M 9/10 | 474/160 |

* cited by examiner

BICYCLE REAR SPROCKET ASSEMBLY AND BICYCLE REAR SPROCKET

BACKGROUND OF THE INVENTION

Field of the Invention

The present invention relates to a bicycle rear sprocket assembly and a bicycle rear sprocket.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. Bicycle components that have been extensively redesigned are a bicycle rear sprocket assembly and a bicycle rear sprocket.

SUMMARY OF THE INVENTION

In accordance with a first aspect of the present invention, a bicycle rear sprocket assembly comprises a first sprocket. The first sprocket has a first bicycle inbound facing surface and a first bicycle outbound facing surface opposite to the first bicycle inbound facing surface in an axial direction parallel to a rotational center axis of the bicycle rear sprocket assembly. The first sprocket includes a first sprocket body, a plurality of first sprocket teeth, a bearing unit mounting section, and a first torque-transmitting structure. The plurality of first sprocket teeth extend radially outwardly from a first radially outer periphery of the first sprocket body with respect to the rotational center axis. The bearing unit mounting section is at least partly provided to a first radially inner periphery of the first sprocket body. The first torque-transmitting structure is configured to transmit pedaling torque to a second sprocket separately disposed adjacent to the first sprocket without another sprocket between the first sprocket and the second sprocket. The first torque-transmitting structure is provided to the first bicycle inbound facing surface and is a separate member from the second sprocket.

With the bicycle rear sprocket assembly according to the first aspect, it is possible to mount the first sprocket, which is a radially small sprocket having less than or equal to ten teeth, to the bicycle rear hub assembly. Accordingly, a bicycle to which the bicycle rear sprocket assembly is mounted can have a wide range of gear ratio.

In accordance with a second aspect of the present invention, the bicycle rear sprocket assembly according to the first aspect further comprises a bearing unit disposed in the bearing unit mounting section.

With the bicycle rear sprocket assembly according to the second aspect, it is further possible to mount the first sprocket, which is a radially small sprocket having less than or equal to ten teeth, to the bicycle rear hub assembly. Accordingly, a bicycle to which the bicycle rear sprocket assembly is mounted can have a further wide range of gear ratio.

In accordance with a third aspect of the present invention, the bicycle rear sprocket assembly according to any one of the above aspects is configured so that the first torque-transmitting structure extends in the axial direction from the first sprocket body of the first sprocket.

With the bicycle rear sprocket assembly according to the third aspect, it is further possible to mount the first sprocket, which is a radially small sprocket having less than or equal to ten teeth, to the bicycle rear hub assembly. Accordingly, a bicycle to which the bicycle rear sprocket assembly is mounted can have a further wide range of gear ratio.

In accordance with a fourth aspect of the present invention, the bicycle rear sprocket assembly according to any one of the above aspects is configured so that the first torque-transmitting structure is configured to transmit the pedaling torque to a second torque-transmitting structure of the second sprocket in a state where the bicycle rear sprocket assembly is mounted to a bicycle rear hub assembly.

With the bicycle rear sprocket assembly according to the fourth aspect, it is possible to reliably transmit the pedaling torque from the first sprocket to the second sprocket.

In accordance with a fifth aspect of the present invention, the bicycle rear sprocket assembly according to any one of the above aspects is configured so that the first torque-transmitting structure includes a first splined portion. The second torque-transmitting structure includes a second splined portion configured to engage with the first splined portion in the state where the bicycle rear sprocket assembly is mounted to the bicycle rear hub assembly.

With the bicycle rear sprocket assembly according to the fifth aspect, it is possible to further reliably transmit the pedaling torque from the first sprocket to the second sprocket.

In accordance with a sixth aspect of the present invention, the bicycle rear sprocket assembly according to any one of the above aspects is configured so that the first torque-transmitting structure is integrally formed with the first sprocket body as a one-piece unitary member.

With the bicycle rear sprocket assembly according to the sixth aspect, it is possible to enhance rigidity of the first torque-transmitting structure.

In accordance with a seventh aspect of the present invention, the bicycle rear sprocket assembly according to any one of the above aspects is configured so that the first torque-transmitting structure includes a spacer portion configured to define an axial gap between the first sprocket and the second sprocket in the axial direction in a state where the bicycle rear sprocket assembly is mounted to a bicycle rear hub assembly.

With the bicycle rear sprocket assembly according to the seventh aspect, it is possible to precisely set the axial gap between the first sprocket and the second sprocket to a predetermined gap length.

In accordance with an eighth aspect of the present invention, the bicycle rear sprocket assembly according to the seventh aspect is configured so that the first torque-transmitting structure includes a first splined portion. The second sprocket includes a second torque-transmitting structure including a second splined portion configured to engage with the first splined portion in the state where the bicycle rear sprocket assembly is mounted to the bicycle rear hub assembly.

With the bicycle rear sprocket assembly according to the eighth aspect, it is possible to further reliably transmit the pedaling torque from the first sprocket to the second sprocket.

In accordance with a ninth aspect of the present invention, the bicycle rear sprocket assembly according to any one of the above aspects is configured so that the spacer portion is disposed between the first splined portion and the first sprocket body in the axial direction.

With the bicycle rear sprocket assembly according to the ninth aspect, it is possible to further precisely set the axial gap between the first sprocket and the second sprocket to a predetermined gap length.

In accordance with a tenth aspect of the present invention, the bicycle rear sprocket assembly according to any one of the above aspects further comprises a bearing unit disposed in the bearing unit mounting section provided radially inwardly from the first sprocket body and the spacer portion.

With the bicycle rear sprocket assembly according to the tenth aspect, it is possible to secure a bearing unit whose axial length is longer than an axial length of the first sprocket teeth. Therefore, the bearing unit can stably support the bicycle rear sprocket assembly.

In accordance with an eleventh aspect of the present invention, the bicycle rear sprocket assembly according to any one of the above aspects is configured so that the first sprocket has a first total tooth number that is equal to or smaller than ten.

With the bicycle rear sprocket assembly according to the eleventh aspect, it is possible to mount the first sprocket, which is a radially small sprocket having less than or equal to ten teeth, to the bicycle rear hub assembly. Accordingly, a bicycle to which the bicycle rear sprocket assembly is mounted can have a further wide range of gear ratio.

In accordance with a twelfth aspect of the present invention, the bicycle rear sprocket assembly according to any one of the above aspects further comprises the second sprocket. The second sprocket has a second bicycle inbound facing surface and a second bicycle outbound facing surface opposite to the second bicycle inbound facing surface in the axial direction. The second sprocket includes a second sprocket body, a plurality of second sprocket teeth, and a second torque-transmitting structure. The plurality of second sprocket teeth extend radially outwardly from a second radially outer periphery of the second sprocket body with respect to the rotational center axis. The second torque-transmitting structure is provided to the second bicycle outbound facing surface. The first torque-transmitting structure is configured to transmit the pedaling torque to the second torque-transmitting structure in a state where the bicycle rear sprocket assembly is mounted to a bicycle rear hub assembly.

With the bicycle rear sprocket assembly according to the twelfth aspect, it is possible to mount the first and second sprockets, which are radially small sprockets, to the bicycle rear hub assembly. Accordingly, a bicycle to which the bicycle rear sprocket assembly is mounted can have a further wide range of gear ratio.

In accordance with a thirteenth aspect of the present invention, the bicycle rear sprocket assembly according to any one of the above aspects is configured so that the second sprocket includes an additional torque-transmitting structure provided to the second bicycle inbound facing surface. The additional torque-transmitting structure is configured to transmit the pedaling torque to a sprocket support portion of the bicycle rear hub assembly in the state where the bicycle rear sprocket assembly is mounted to the bicycle rear hub assembly.

With the bicycle rear sprocket assembly according to the thirteenth aspect, it is possible to reliably transmit the pedaling torque from the second sprocket to the bicycle rear hub assembly.

In accordance with a fourteenth aspect of the present invention, the bicycle rear sprocket assembly according to any one of the above aspects further comprises a third sprocket. The third sprocket has a third bicycle inbound facing surface and a third bicycle outbound facing surface opposite to the third bicycle inbound facing surface in the axial direction. The third sprocket includes a third sprocket body, a plurality of third sprocket teeth, and a third torque-transmitting structure. The plurality of third sprocket teeth extend radially outwardly from a third radially outer periphery of the third sprocket body with respect to the rotational center axis. The third torque-transmitting structure is configured to transmit the pedaling torque to the sprocket support portion of the bicycle rear hub assembly in the state where the bicycle rear sprocket assembly is mounted to the bicycle rear hub assembly. The third sprocket is separately disposed adjacent to the second sprocket without another sprocket between the second sprocket and the third sprocket so that the third bicycle outbound facing surface of the third sprocket faces the second bicycle inbound facing surface of the second sprocket in the axial direction in the state where the bicycle rear sprocket assembly is mounted to the bicycle rear hub assembly.

With the bicycle rear sprocket assembly according to the fourteenth aspect, it is possible to mount the first to third sprockets, which are radially small sprockets, to the bicycle rear hub assembly. Accordingly, a bicycle to which the bicycle rear sprocket assembly is mounted can have a further wide range of gear ratio.

In accordance with a fifteenth aspect of the present invention, the bicycle rear sprocket assembly according to any one of the above aspects further comprises a fourth sprocket. The fourth sprocket has a fourth bicycle inbound facing surface and a fourth bicycle outbound facing surface opposite to the fourth bicycle inbound facing surface in the axial direction. The fourth sprocket includes a fourth sprocket body, a plurality of fourth sprocket teeth, and a fourth torque-transmitting structure. The plurality of fourth sprocket teeth extend radially outwardly from a fourth radially outer periphery of the fourth sprocket body with respect to the rotational center axis. The fourth torque-transmitting structure is configured to transmit the pedaling torque to the sprocket support portion of the bicycle rear hub assembly in the state where the bicycle rear sprocket assembly is mounted to the bicycle rear hub assembly. The fourth sprocket is separately disposed adjacent to the third sprocket without another sprocket between the third sprocket and the fourth sprocket so that the fourth bicycle outbound facing surface of the fourth sprocket faces the third bicycle inbound facing surface of the third sprocket in the axial direction in the state where the bicycle rear sprocket assembly is mounted to the bicycle rear hub assembly.

With the bicycle rear sprocket assembly according to the fifteenth aspect, it is possible to mount the first to fourth sprockets, which are radially small sprockets, to the bicycle rear hub assembly. Accordingly, a bicycle to which the bicycle rear sprocket assembly is mounted can have a further wide range of gear ratio.

In accordance with a sixteenth aspect of the present invention, the bicycle rear sprocket assembly according to any one of the above aspects further comprises a sprocket carrier and at least one additional sprocket. The sprocket carrier includes at least one sprocket mounting portion and a fifth torque-transmitting structure configured to transmit the pedaling torque to the sprocket support portion of the bicycle rear hub assembly in the state where the bicycle rear sprocket assembly is mounted to the bicycle rear hub assembly. The at least one additional sprocket is mounted to the at least one sprocket mounting portion.

With the bicycle rear sprocket assembly according to the sixteenth aspect, using the sprocket carrier enables a plurality of sprockets to be mounted to the bicycle rear hub assembly without increasing a weight of the bicycle rear hub assembly too much. Accordingly, a bicycle to which the bicycle rear sprocket assembly is mounted can have a further wide range of gear ratio.

In accordance with a seventeenth aspect of the present invention, the bicycle rear sprocket assembly according to any one of the above aspects is configured so that the at least one sprocket mounting portion includes a plurality of sprocket mounting portions. The at least one additional sprocket includes a plurality of additional sprockets each of which is mounted to each of the plurality of sprocket mounting portions.

With the bicycle rear sprocket assembly according to the seventeenth aspect, using the sprocket carrier enables a plurality of sprockets to be mounted to the bicycle rear hub assembly without increasing a weight of the bicycle rear hub assembly too much. Accordingly, a bicycle to which the bicycle rear sprocket assembly is mounted can have a further wide range of gear ratio.

In accordance with an eighteenth aspect of the present invention, the bicycle rear sprocket assembly according to any one of the above aspects is configured so that the third torque-transmitting structure includes a third splined portion.

With the bicycle rear sprocket assembly according to the eighteenth aspect, it is possible to reliably transmit the pedaling torque from the third sprocket to the bicycle rear hub assembly.

In accordance with a nineteenth aspect of the present invention, the bicycle rear sprocket assembly according to any one of the above aspects is configured so that the fourth torque-transmitting structure includes a fourth splined portion.

With the bicycle rear sprocket assembly according to the nineteenth aspect, it is possible to reliably transmit the pedaling torque from the fourth sprocket to the bicycle rear hub assembly.

In accordance with a twentieth aspect of the present invention, the bicycle rear sprocket assembly according to any one of the above aspects is configured so that the fifth torque-transmitting structure includes a fifth splined portion.

With the bicycle rear sprocket assembly according to the twentieth aspect, it is possible to reliably transmit the pedaling torque from the sprocket carrier to the bicycle rear hub assembly.

In accordance with a twenty-first aspect of the present invention, a bicycle rear sprocket has a bicycle inbound facing surface and a bicycle outbound facing surface opposite to the bicycle inbound facing surface in an axial direction parallel to a rotational center axis of the bicycle rear sprocket. The bicycle rear sprocket includes a sprocket body, a plurality of sprocket teeth, a bearing unit mounting section, and a torque-transmitting structure. The plurality of sprocket teeth extends radially outwardly from a radially outer periphery of the sprocket body with respect to the rotational center axis. The bearing unit mounting section is at least partly provided to a radially inner periphery of the sprocket body. The torque-transmitting structure is configured to transmit pedaling torque to a neighbor rear sprocket separately disposed adjacent to the bicycle rear sprocket without another sprocket between the bicycle rear sprocket and the neighbor rear sprocket. The torque-transmitting structure is provided to the bicycle inbound facing surface and is a separate member from the neighbor rear sprocket.

With the bicycle rear sprocket according to the twenty-first aspect, it is possible to provide a bicycle rear sprocket, which is a radially small sprocket having less than or equal to ten teeth and which is mountable to the bicycle rear hub assembly.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

First Embodiment

Figure 1:
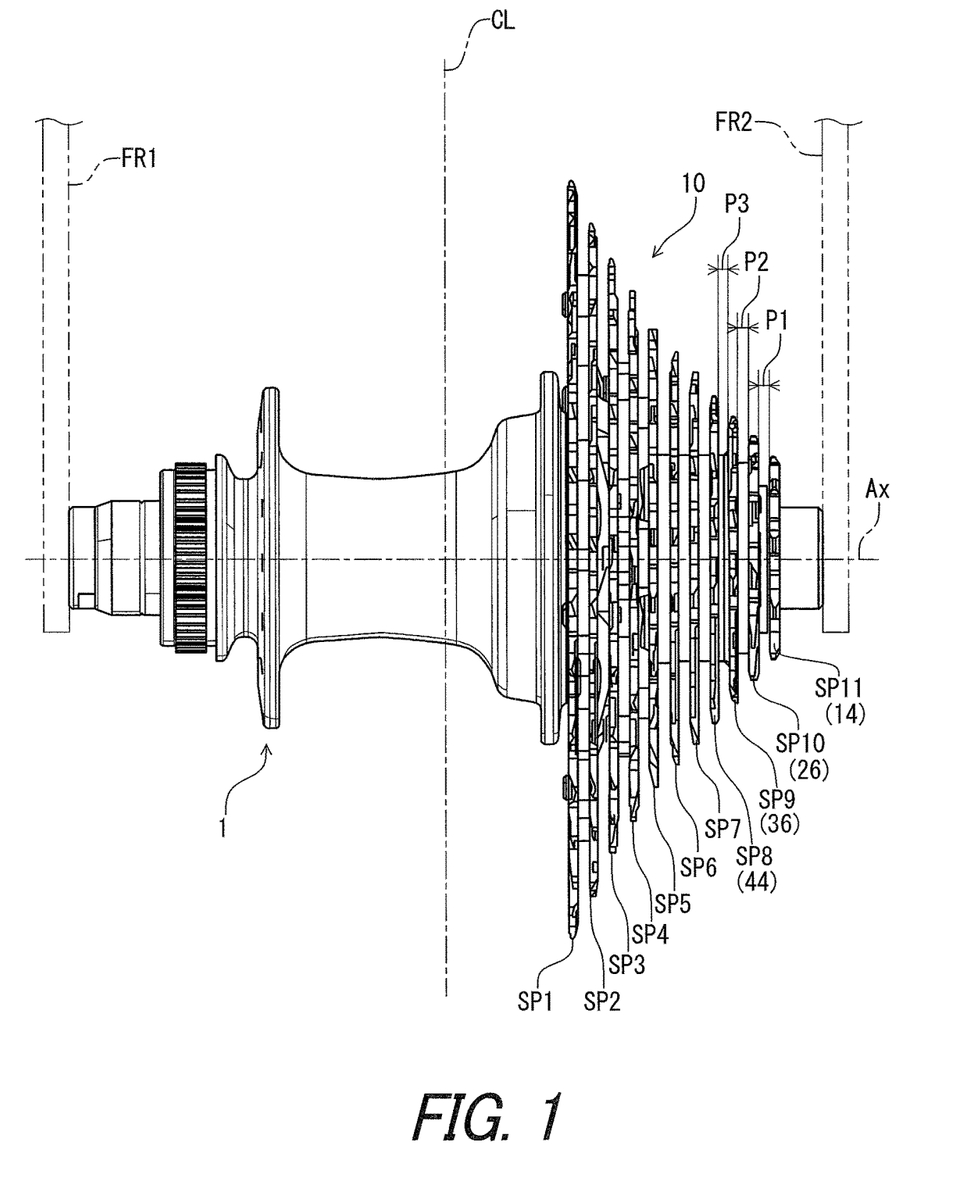
FIG. 1 is an elevational view of a bicycle rear sprocket assembly attached to a bicycle rear hub assembly in accordance with a first embodiment.

FIG. 1 illustrates a bicycle rear sprocket assembly 10 attached to a bicycle rear hub assembly 1 in accordance with a first embodiment. In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle (not shown) with facing a handlebar. Accordingly, these terms, as utilized to describe the bicycle rear hub assembly 1 and the bicycle rear sprocket assembly 10, should be interpreted relative to the bicycle equipped with the bicycle rear hub assembly 1 and the bicycle rear sprocket assembly 10 as used in an upright riding position on a horizontal surface.

Figure 2:
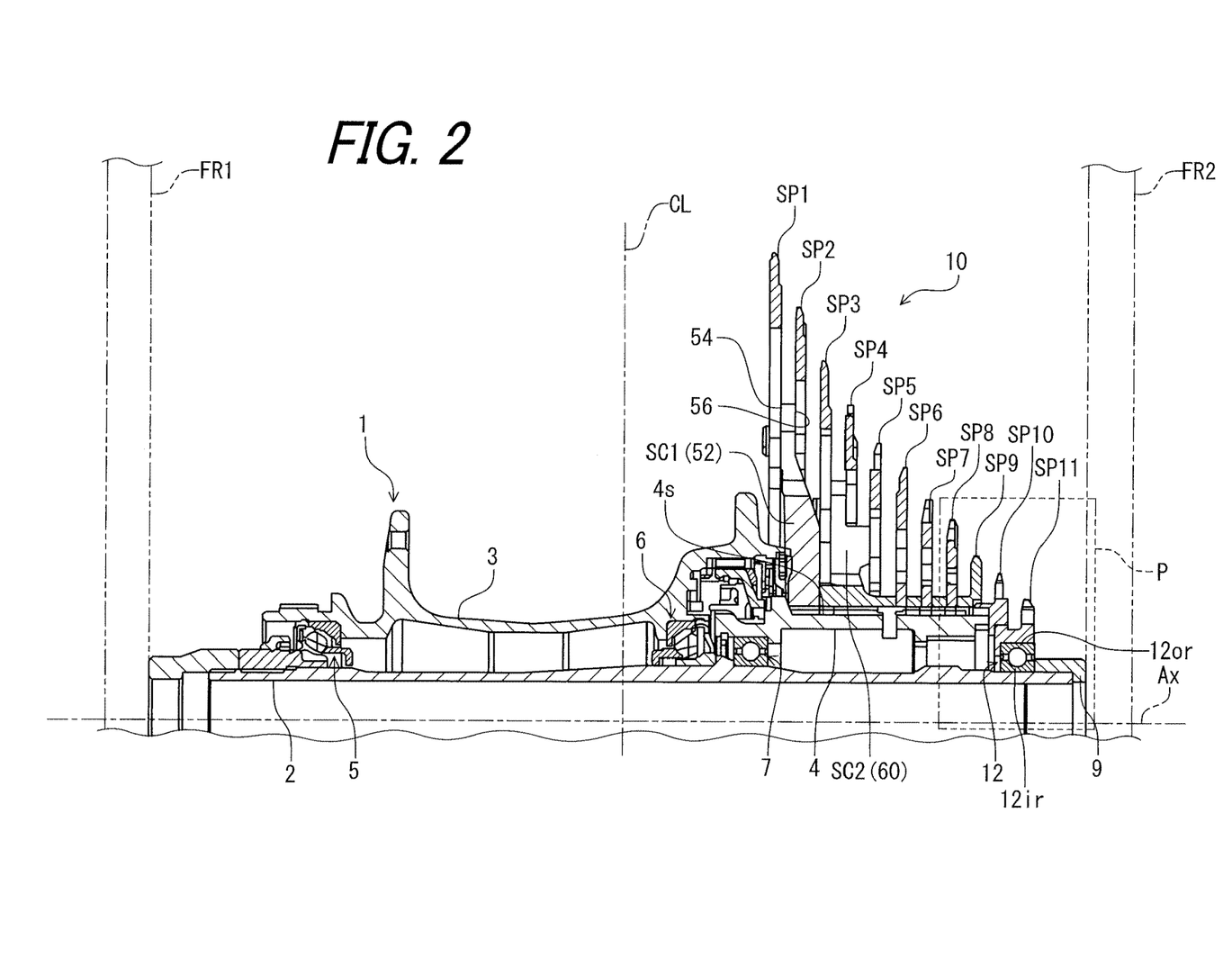
FIG. 2 is a partially cross-sectional view of the bicycle rear sprocket assembly illustrated in FIG. 1.

As seen in FIG. 2, the bicycle rear hub assembly 1 comprises a hub axle 2, a hub shell 3, and a sprocket support portion 4. The hub axle 2 defines a rotational center axis Ax. The rotational center axis Ax can be regarded as the rotational center axis Ax of the bicycle rear sprocket assembly 10 because the bicycle rear sprocket assembly 10 is coaxially mounted to the bicycle rear hub assembly 1. The hub axle 2 has a tubular shape and extends along the rotational center axis Ax. The hub axle 2 is secured to bicycle frames FR1, FR2 via a wheel securing assembly (not shown). The bicycle frames FR1 indicate a left seat stay and a left chain stay. The bicycle frames FR2 indicate a right seat stay and a right chain stay. The hub shell 3 is rotatably mounted on the hub axle 2 to rotate about the rotational center axis Ax. The sprocket support portion 4 is rotatably mounted on the hub axle 2 to rotate about the rotational center axis Ax. The bicycle frames FR1, FR2 defines an axial centerline CL of the bicycle rear hub assembly 1 which extends in the middle of the bicycle frames FR1, FR2 viewed in a radial direction perpendicular to the rotational center axis Ax.

As seen in FIG. 2, the sprocket support portion 4 is configured to support the bicycle rear sprocket assembly 10. That is, the bicycle rear sprocket assembly 10 is configured to be mounted to the sprocket support portion 4 of the bicycle rear hub assembly 1. The sprocket support portion 4 includes a torque-transmitting structure 4s on a radially outer peripheral surface of the sprocket support portion 4. The torque-transmitting structure 4s may include a plurality of splines (FIGS. 4 to 7). The sprocket support portion 4 is configured to receive a rotational force from the bicycle rear sprocket assembly 10 during pedaling. The bicycle rear hub assembly 1 comprises a first bearing unit 5 and a second bearing unit 6. The first bearing unit 5 and the second bearing unit 6 are provided between the hub axle 2 and the hub shell 3 to rotatably support the hub shell 3 relative to the hub axle 2 about the rotational center axis Ax.

The bicycle rear hub assembly 1 comprises a third bearing unit 7. The third bearing unit 7 is provided between the hub axle 2 and the sprocket support portion 4 to rotatably support the sprocket support portion 4 relative to the hub axle 2 about the rotational center axis Ax. The third bearing unit 7 has an annular shape. An outer race of the third bearing unit 7 is secured to the sprocket support portion 4, and an inner race of the third bearing unit 7 is secured to the hub axle 2. The third bearing unit 7 can be the same structure as those of the first bearing unit 5 and the second bearing unit 6 if needed and/or desired. At least one of the first to third bearing units 5 to 7 can be a sliding bearing whereas each of the first to third bearing units 5 to 7 is a rolling bearing in the illustrated embodiment.

The bicycle rear sprocket assembly 10 comprises a sprocket assembly bearing unit 12. In this specification, the sprocket assembly bearing unit 12 can be simply referred to as a bearing unit 12. The bearing unit 12 is provided between the hub axle 2 and the bicycle rear sprocket assembly 10 to rotatably support bicycle rear sprocket assembly 10 relative to the hub axle 2 about the rotational center axis Ax. The bearing unit 12 has an annular shape. An outer race 12or of the bearing unit 12 is secured to the bicycle rear sprocket assembly 10, and an inner race 12ir of the bearing unit 12 is secured to the hub axle 2. The bearing unit 12 can be the same structure as those of the first bearing unit 5 and the second bearing unit 6 if needed and/or desired. Alternatively, the bearing unit 12 can be the same structure as that of the third bearing unit 7 if needed and/or desired. The bearing unit 12 can be a sliding bearing whereas the bearing unit 12 is a rolling bearing in the illustrated embodiment.

The bicycle rear hub assembly 1 comprises an end cap 9. The end cap 9 is mounted on the hub axle 2 to abut against the inner race 12ir of the bearing unit 12. The end cap 9 is mounted to the hub axle 2 in a simple-fit manner. Alternatively, the end cap 9 may be mounted to the hub axle 2 in a press-fit manner, or may be screwed on the hub axle 2.

The bicycle rear sprocket assembly 10 comprises sprockets SP1 to SP11. A total number of the sprockets SP1 to SP11 are not limited to the illustrated embodiment. The sprockets SP1 to SP7 are conventional bicycle sprockets. In the illustrated embodiment, the sprockets SP1 and SP2 are mounted to a first sprocket carrier SC1, and the sprockets SP3 to SP5 are mounted to a second sprocket carrier SC2.

The other sprockets SP6 and SP7 may have splines and be directly engaged with the torque-transmitting structure 4s of the sprocket support portion 4. A total number of the sprockets SP1 to SP7 are not limited to the illustrated embodiment. In this embodiment, the sprocket SP11, the sprocket SP10, the sprocket SP9, the sprocket SP8, and the sprockets SP1 to SP7 can be referred to as a first sprocket, a second sprocket, a third sprocket, a fourth sprocket, and a plurality of additional sprockets, respectively. Further, the sprocket SP11 can be simply referred to as a bicycle rear sprocket SP11.

Figure 3:
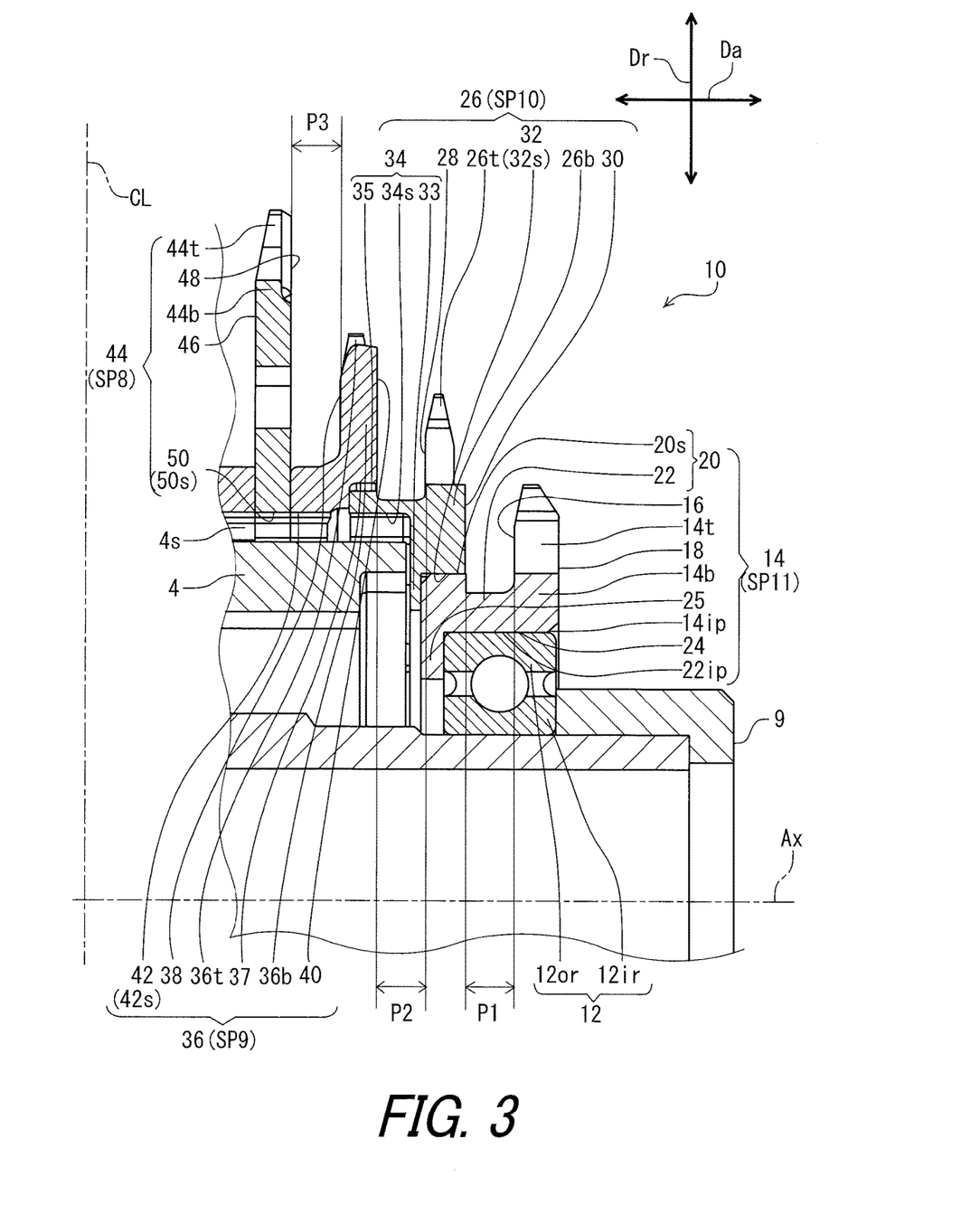
FIG. 3 is an enlarged partially cross-sectional view of a part P of the bicycle rear sprocket assembly illustrated in FIG. 2.
Figure 4:
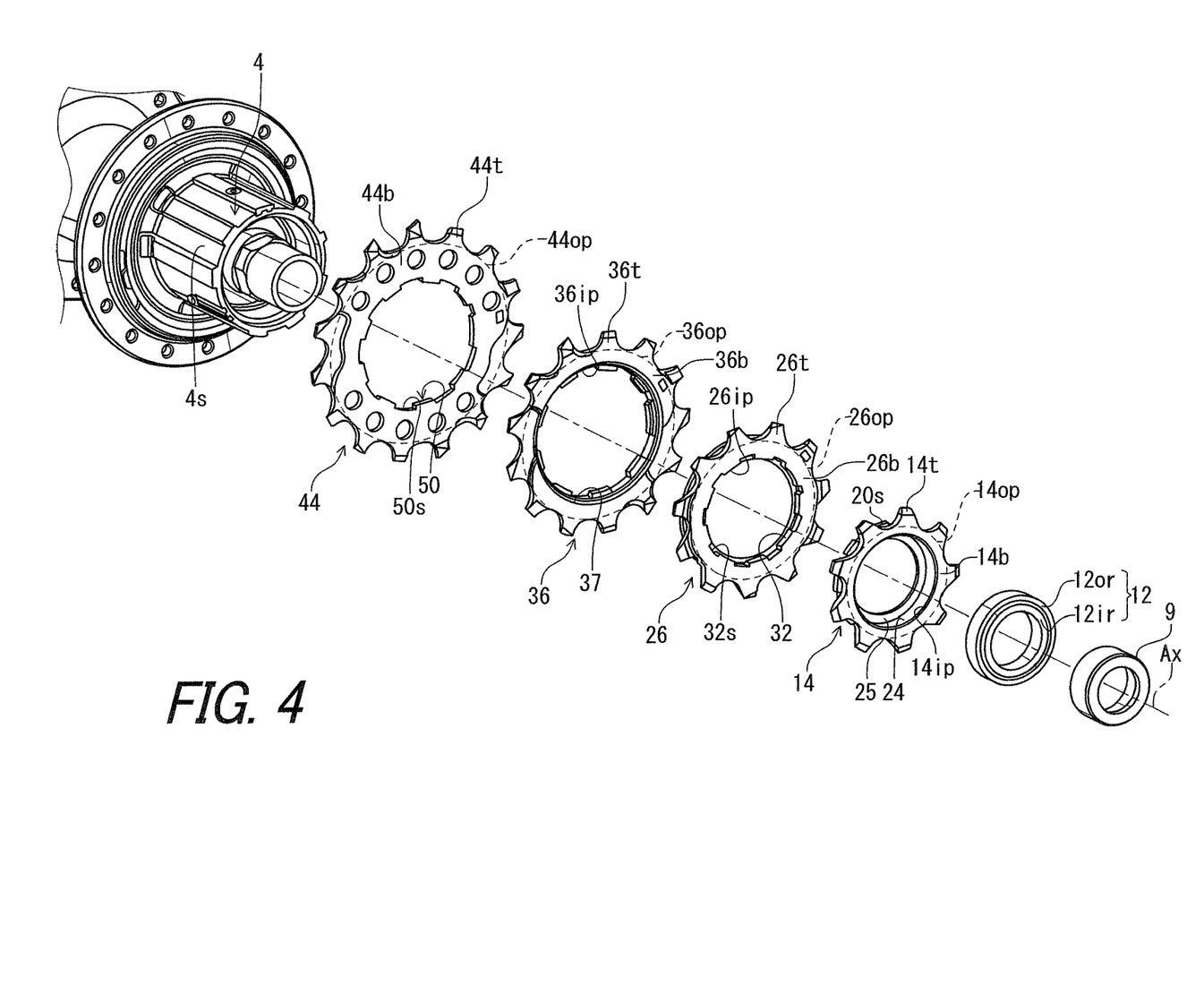
FIG. 4 is an exploded perspective view of a part of the bicycle rear sprocket assembly illustrated in FIG. 1.
Figure 5:
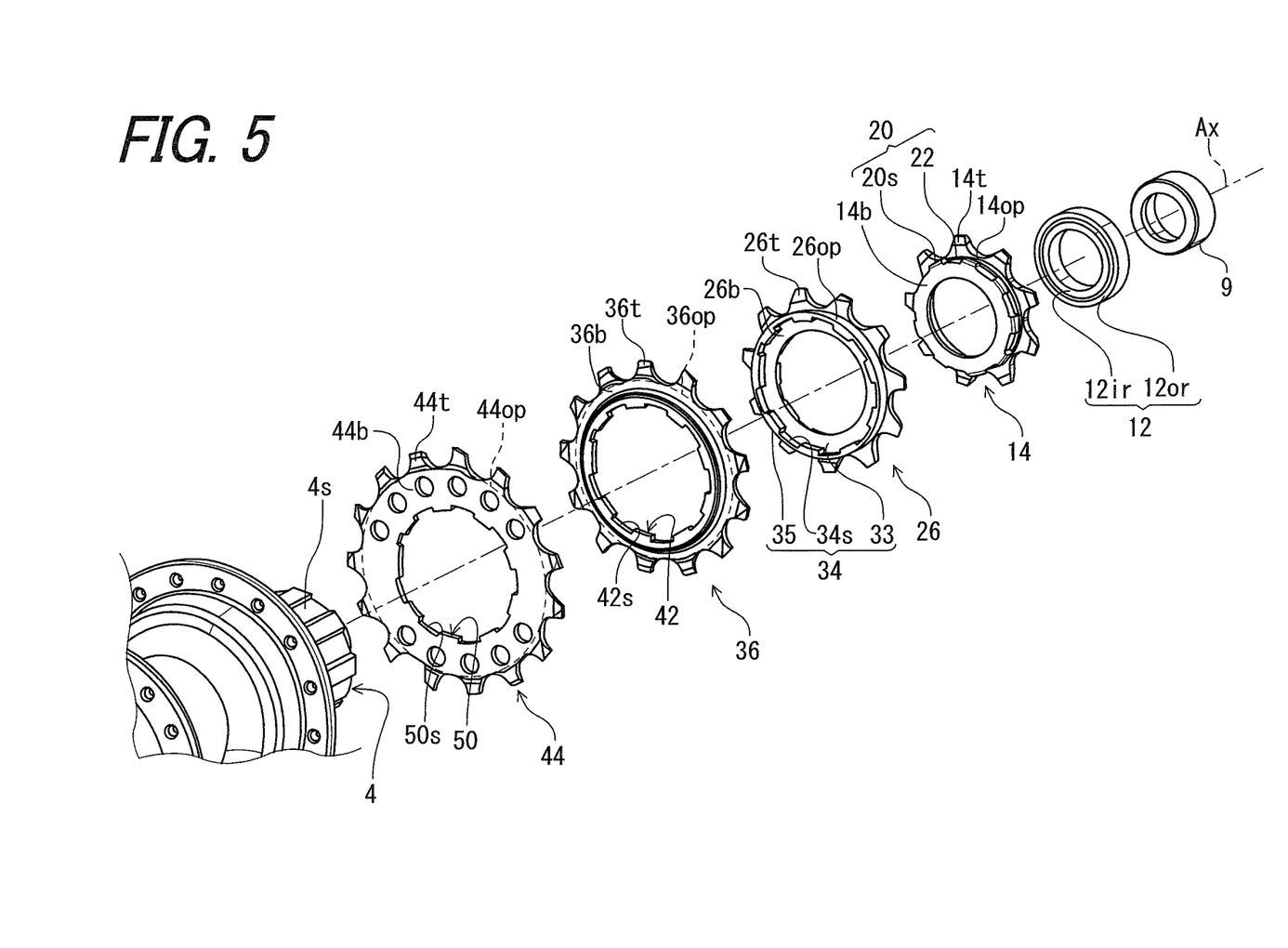
FIG. 5 is an exploded perspective view of a part of the bicycle rear sprocket assembly illustrated in FIG. 1.

As seen in FIG. 3, the bicycle rear sprocket assembly 10 comprises a first sprocket 14 (SP11). The first sprocket 14 has a first bicycle inbound facing surface 16. The first bicycle inbound facing surface 16 faces toward the axial centerline CL of the bicycle rear hub assembly 1. The first sprocket 14 has a first bicycle outbound facing surface 18 opposite to the first bicycle inbound facing surface 16 in an axial direction Da parallel to the rotational center axis Ax of the bicycle rear sprocket assembly 10. In other words, the first bicycle outbound facing surface 18 faces in a reverse direction with respect to the axial direction Da in comparison with the first bicycle inbound facing surface 16. The first sprocket 14 includes a first sprocket body 14b and a plurality of first sprocket teeth 14t. The first bicycle inbound facing surface 16 and the first bicycle outbound facing surface 18 are provided on the first sprocket body 14b and the plurality of first sprocket teeth 14t. As seen in FIGS. 4 and 5, the first sprocket body 14b has a first radially outer periphery 14op and a first radially inner periphery 14ip. The first radially inner periphery 14ip is around the rotational center axis Ax. The first radially outer periphery 14op is opposite to and around the first radially inner periphery 14ip in a radial direction Dr perpendicular to the rotational center axis Ax. The plurality of first sprocket teeth 14t extends radially outwardly from the first radially outer periphery 14op of the first sprocket body 14b with respect to the rotational center axis Ax. In the following description, the number of first sprocket teeth 14t is referred to as a first total tooth number. The first sprocket 14 has the first total tooth number. Preferably, the first total tooth number is equal to or smaller than ten.

As seen in FIG. 3, the first sprocket 14 includes a first torque-transmitting structure 20. The first torque-transmitting structure 20 is configured to transmit pedaling torque to a second sprocket SP10 (26) separately disposed adjacent to the first sprocket 14 without another sprocket between the first sprocket 14 and the second sprocket 26. The first torque-transmitting structure 20 is provided to the first bicycle inbound facing surface 16. The first torque-transmitting structure 20 extends in the axial direction Da from the first sprocket body 14b of the first sprocket 14. Specifically, the first torque-transmitting structure 20 includes a spacer portion 22. The spacer portion 22 is preferably connected to the first sprocket body 14b. The first torque-transmitting structure 20 includes a first splined portion 20s. The first splined portion 20s is preferably connected to the spacer portion 22. That is, the spacer portion 22 is disposed between the first splined portion 20s and the first sprocket body 14b in the axial direction Da. The spacer portion 22 is configured to define an axial gap P1 between the first sprocket SP11 (14) and the second sprocket SP10 (26) in the axial direction Da in a state where the bicycle rear sprocket assembly 10 is mounted to the bicycle rear hub assembly 1. The first splined portion 20s is configured to engage with a second splined portion 32s of the second sprocket 26 to be described in detail below. The first splined portion 20s and the spacer portion 22 are integrally formed with the first sprocket body 14b as a one-piece unitary member. That is, the first torque-transmitting structure 20 is integrally formed with the first sprocket body 14b as a one-piece unitary member. However, the first torque-transmitting structure 20 is a separate member from the second sprocket 26.

As seen in FIGS. 3 and 4, the first sprocket 14 includes a bearing unit mounting section 24 at least partly provided to the first radially inner periphery 14ip of the first sprocket body 14b. Specifically, the bearing unit mounting section 24 is provided radially inwardly from the first sprocket body 14b and the spacer portion 22 with respect to the rotational center axis Ax. The bearing unit mounting section 24 can be provided on at least one of the first radially inner periphery 14ip and a spacer radially inner periphery 22ip. The bearing unit mounting section 24 is provided on the first radially inner periphery 14ip and a spacer radially inner periphery 22ip in the illustrated embodiment. The bearing unit 12 is disposed in the bearing unit mounting section 24. Specifically, the bearing unit 12 is disposed in the bearing unit mounting section 24 provided radially inwardly from the first sprocket body 14b and the spacer portion 22. Further, the first sprocket 14 includes a first radially inward protruding portion 25 connected to the bearing unit mounting section 24. The first radially inward protruding portion 25 protrudes from the bearing unit mounting section 24 toward the rotational center axis Ax to abut against the outer race 12or of the bearing unit 12.

As seen in FIG. 3, the bicycle rear sprocket assembly 10 further comprises the second sprocket 26 (SP10). The second sprocket 26 is separately disposed adjacent to the first sprocket 14 without another sprocket between the first sprocket 14 and the second sprocket 26. The second sprocket 26 has a second bicycle inbound facing surface 28. The second bicycle inbound facing surface 28 faces toward the axial centerline CL of the bicycle rear hub assembly 1. The second sprocket 26 has a second bicycle outbound facing surface 30 opposite to the second bicycle inbound facing surface 28 in the axial direction Da. In other words, the second bicycle outbound facing surface 30 faces in a reverse direction with respect to the axial direction Da in comparison with the second bicycle inbound facing surface 28.

The second sprocket 26 includes a second sprocket body 26b and a plurality of second sprocket teeth 26t. The second bicycle inbound facing surface 28 and the second bicycle outbound facing surface 30 are provided on the second sprocket body 26b and the plurality of second sprocket teeth 26t. As seen in FIGS. 4 and 5, the second sprocket body 26b has a second radially outer periphery 26op and a second radially inner periphery 26ip. The second radially inner periphery 26ip is around the rotational center axis Ax. The second radially outer periphery 26op is opposite to and around the second radially inner periphery 26ip in the radial direction Dr perpendicular to the rotational center axis Ax. The plurality of second sprocket teeth 26t extends radially outwardly from the second radially outer periphery 26op of the second sprocket body 26b with respect to the rotational center axis Ax. In the following description, the number of second sprocket teeth 26t is referred to as a second total tooth number. The second sprocket 26 has the second total tooth number that is larger than the first total tooth number. In the illustrated embodiment, the second total tooth number is eleven.

As seen in FIG. 3, the second sprocket 26 includes a second torque-transmitting structure 32. The second torque-transmitting structure 32 is provided to the second bicycle outbound facing surface 30. The second torque-transmitting structure 32 extends in the axial direction Da from the second bicycle outbound facing surface 30. The second torque-transmitting structure 32 is configured to receive pedaling torque from the first torque-transmitting structure 20 in a state where the bicycle rear sprocket assembly 10 is mounted to the bicycle rear hub assembly 1. That is, the first torque-transmitting structure 20 is configured to transmit the pedaling torque to the second torque-transmitting structure 32 of the second sprocket 26 in a state where the bicycle rear sprocket assembly 10 is mounted to the bicycle rear hub assembly 1. In other words, the first torque-transmitting structure 20 is configured to transmit the pedaling torque to the second sprocket 26 separately disposed adjacent to the first sprocket 14 without another sprocket between the first sprocket 14 and the second sprocket 26. The first torque-transmitting structure 20 is configured to transmit the pedaling torque to the second torque-transmitting structure 32 of the second sprocket 26 in the state where the bicycle rear sprocket assembly 10 is mounted to the bicycle rear hub assembly 1. As seen in FIGS. 3 and 4, the second torque-transmitting structure 32 includes a second splined portion 32s configured to engage with the first splined portion 20s in the state where the bicycle rear sprocket assembly 10 is mounted to the bicycle rear hub assembly 1.

The second sprocket 26 includes an additional torque-transmitting structure 34 provided to the second bicycle inbound facing surface 28. The additional torque-transmitting structure 34 has an axial length in the axial direction Da which is longer than a sprocket pitch P2 between the second sprocket 26 (SP10) and the third sprocket 36 (SP9) Specifically, as seen in FIGS. 3 and 5, the additional torque-transmitting structure 34 includes a second radially inward protruding portion 33 connected to the second sprocket body 26b. The additional torque-transmitting structure 34 includes an additional splined portion 34s connected to the second radially inward protruding portion 33. The second radially inward protruding portion 33 protrudes from the second torque-transmitting structure 32 toward the rotational center axis Ax to abut against the first torque-transmitting structure 20 of the first sprocket 14. That is, the second radially inward protruding portion 33 is disposed between the additional splined portion 34s and the second sprocket body 26b in the axial direction Da. The additional splined portion 34s is configured to engage with the torque-transmitting structure 4s of the sprocket support portion 4. Accordingly, the additional torque-transmitting structure 34 is configured to transmit the pedaling torque to the sprocket support portion 4 of the bicycle rear hub assembly 1 in the state where the bicycle rear sprocket assembly 10 is mounted to the bicycle rear hub assembly 1. The additional splined portion 34s and the second radially inward protruding portion 33 are integrally formed with the second sprocket body 26b as a one-piece unitary member. That is, the additional torque-transmitting structure 34 is integrally formed with the second sprocket body 26b as a one-piece unitary member. However, the additional torque-transmitting structure 34 can be a separate member from the third sprocket SP9 (36).

The additional torque-transmitting structure 34 further includes an outward protruding portion 35 opposite to the additional splined portion 34s in a radial direction Dr perpendicular to the axial direction Da. The outward protruding portion 35 protrudes radially outwardly from the additional splined portion 34s with respect to the rotational center axis Ax. The outward protruding portion 35 is received in a stepped recess 37 of the third sprocket 36.

As seen in FIG. 3, the bicycle rear sprocket assembly 10 further comprises the third sprocket 36 (SP9). The third sprocket 36 has a third bicycle inbound facing surface 38. The third bicycle inbound facing surface 38 faces toward the axial centerline CL of the bicycle rear hub assembly 1. The third sprocket 36 has a third bicycle outbound facing surface 40 opposite to the third bicycle inbound facing surface 38 in the axial direction Da.

In other words, the third bicycle outbound facing surface 40 faces in a reverse direction with respect to the axial direction Da in comparison with the third bicycle inbound facing surface 38. The third sprocket 36 is separately disposed adjacent to the second sprocket 26 without another sprocket between the second sprocket 26 and the third sprocket 36 so that the third bicycle outbound facing surface 40 of the third sprocket 36 faces the second bicycle inbound facing surface 28 of the second sprocket 26 in the axial direction Da in the state where the bicycle rear sprocket assembly 10 is mounted to the bicycle rear hub assembly 1.

The third sprocket 36 includes a third sprocket body 36b and a plurality of third sprocket teeth 36t. The third bicycle inbound facing surface 38 and the third bicycle outbound facing surface 40 are provided on the third sprocket body 36b and the plurality of third sprocket teeth 36t. As seen in FIGS. 4 and 5, the third sprocket body 36b has a third radially outer periphery 36op and a third radially inner periphery 36ip. The third radially inner periphery 36ip is around the rotational center axis Ax. The third radially outer periphery 36op is opposite to and around the third radially inner periphery 36ip in the radial direction Dr perpendicular to the rotational center axis Ax. The plurality of third sprocket teeth 36t extends radially outwardly from the third radially outer periphery 36op of the third sprocket body 36b with respect to the rotational center axis Ax. In the following description, the number of third sprocket teeth 36t is referred to as a third total tooth number. The third sprocket 36 has the third total tooth number that is larger than the second total tooth number. Preferably, the third total tooth number is thirteen.

As seen in FIGS. 3 and 4, the third sprocket 36 includes the stepped recess 37. The stepped recess 37 is provided to the third bicycle outbound facing surface 40. The stepped recess 37 extends in the axial direction Da toward the axial center line CL of the bicycle rear hub assembly 1 in the state where the bicycle rear sprocket assembly 10 is mounted to the bicycle rear hub assembly 1. The stepped recess 37 is recessed in the axial direction Da to receive the outward protruding portion 35 of the second sprocket 26.

The third sprocket 36 includes a third torque-transmitting structure 42 provided to the third bicycle inbound facing surface 38. Specifically, as seen in FIGS. 3 and 5, the third torque-transmitting structure 42 is connected to the third sprocket body 36b. The third torque-transmitting structure 42 extends from the stepped recess 37 to the fourth sprocket SP8 in the axial direction Da. The third torque-transmitting structure 42 has an axial length in the axial direction Da which is longer than a sprocket pitch P3 between the third sprocket 36 and the fourth sprocket SP8 (44). As seen in FIG. 5, the third torque-transmitting structure 42 includes a plurality of third splined portions 42s. The third splined portion 42s can engage with the torque-transmitting structure 4s of the sprocket support portion 4. That is, the third torque-transmitting structure 42 is configured to transmit the pedaling torque to the sprocket support portion 4 of the bicycle rear hub assembly 1 in the state where the bicycle rear sprocket assembly 10 is mounted to the bicycle rear hub assembly 1.

As seen in FIG. 3, the bicycle rear sprocket assembly 10 further comprises the fourth sprocket 44 (SP8). The fourth sprocket 44 has a fourth bicycle inbound facing surface 46. The fourth bicycle inbound facing surface 46 faces toward the axial centerline CL of the bicycle rear hub assembly 1. The fourth sprocket 44 has a fourth bicycle outbound facing surface 48 opposite to the fourth bicycle inbound facing surface 46 in the axial direction Da. In other words, the fourth bicycle outbound facing surface 48 faces in a reverse direction with respect to the axial direction Da in comparison with the fourth bicycle inbound facing surface 46. The fourth sprocket 44 is separately disposed adjacent to the third sprocket 36 without another sprocket between the third sprocket 36 and the fourth sprocket 44 so that the fourth bicycle outbound facing surface 48 of the fourth sprocket 44 faces the third bicycle inbound facing surface 38 of the third sprocket 36 in the axial direction Da in the state where the bicycle rear sprocket assembly 10 is mounted to the bicycle rear hub assembly 1.

The fourth sprocket 44 includes a fourth sprocket body 44b and a plurality of fourth sprocket teeth 44t. The fourth bicycle inbound facing surface 46 and the fourth bicycle outbound facing surface 48 are provided on the fourth sprocket body 44b and the plurality of fourth sprocket teeth 44t. As seen in FIGS. 4 and 5, the fourth sprocket body 44b has a fourth radially outer periphery 44op and a fourth torque-transmitting structure 50. The fourth torque-transmitting structure 50 is around the rotational center axis Ax. The fourth radially outer periphery 44op is opposite to and around the fourth torque-transmitting structure 50 in the radial direction Dr perpendicular to the rotational center axis Ax. The plurality of fourth sprocket teeth 44t extends radially outwardly from the fourth radially outer periphery 44op of the fourth sprocket body 44b with respect to the rotational center axis Ax. In the following description, the number of fourth sprocket teeth 44t is referred to as a fourth total tooth number. The fourth sprocket 44 has the fourth total tooth number that is larger than the third total tooth number. Preferably, the fourth total tooth number is fifteen.

The fourth sprocket 44 includes the fourth torque-transmitting structure 50. The fourth torque-transmitting structure 50 provides a radially inner periphery of the fourth sprocket body 44b around the rotational center axis Ax. As seen in FIGS. 4 and 5, the fourth torque-transmitting structure 50 includes a plurality of fourth splined portions 50s. The fourth splined portion 50s can engage with the torque-transmitting structure 4s of the sprocket support portion 4. That is, the fourth torque-transmitting structure 50 is configured to transmit the pedaling torque to the sprocket support portion 4 of the bicycle rear hub assembly 1 in the state where the bicycle rear sprocket assembly 10 is mounted to the bicycle rear hub assembly 1.

Figure 6:
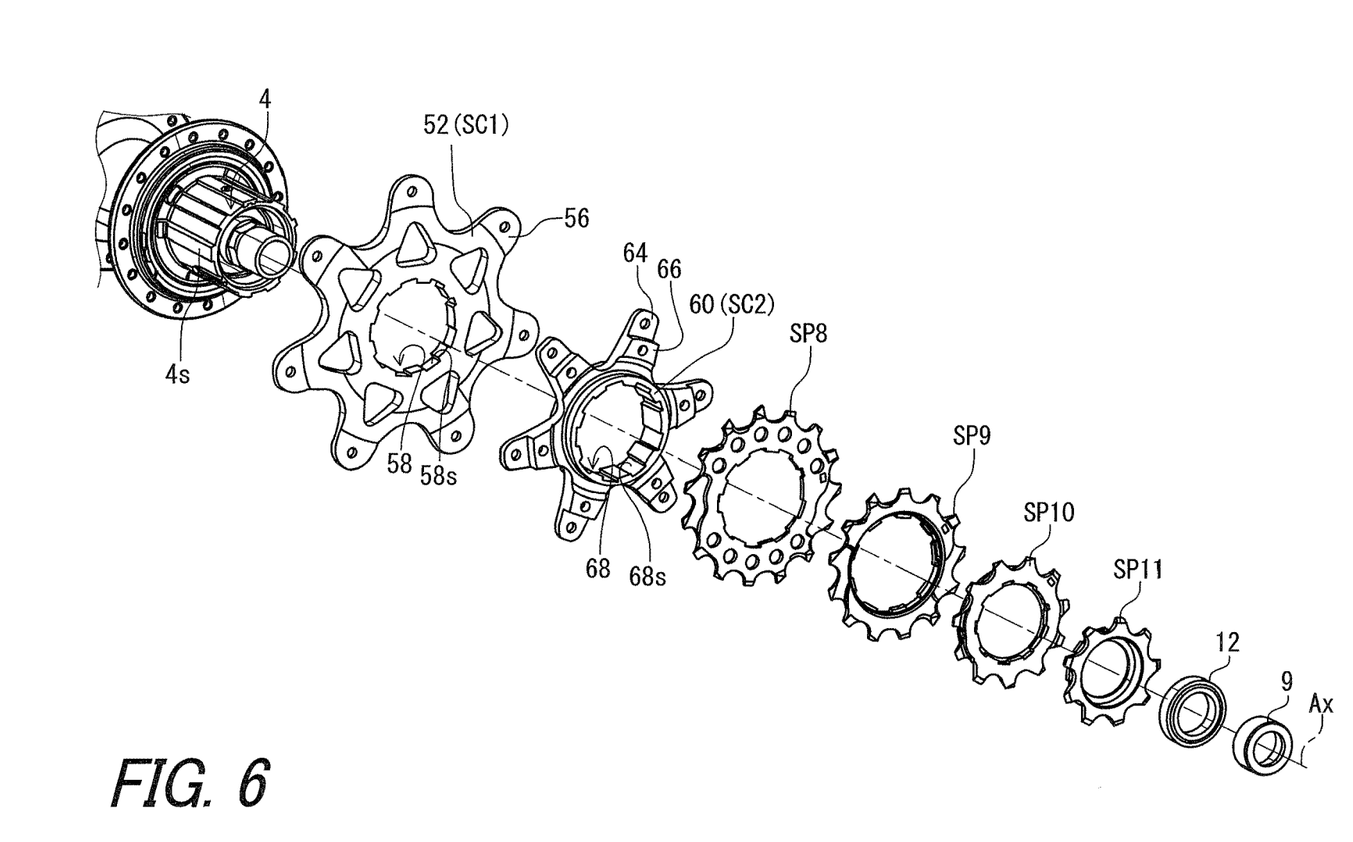
FIG. 6 is an exploded perspective view of a part of the bicycle rear sprocket assembly illustrated in FIG. 1.
Figure 7:
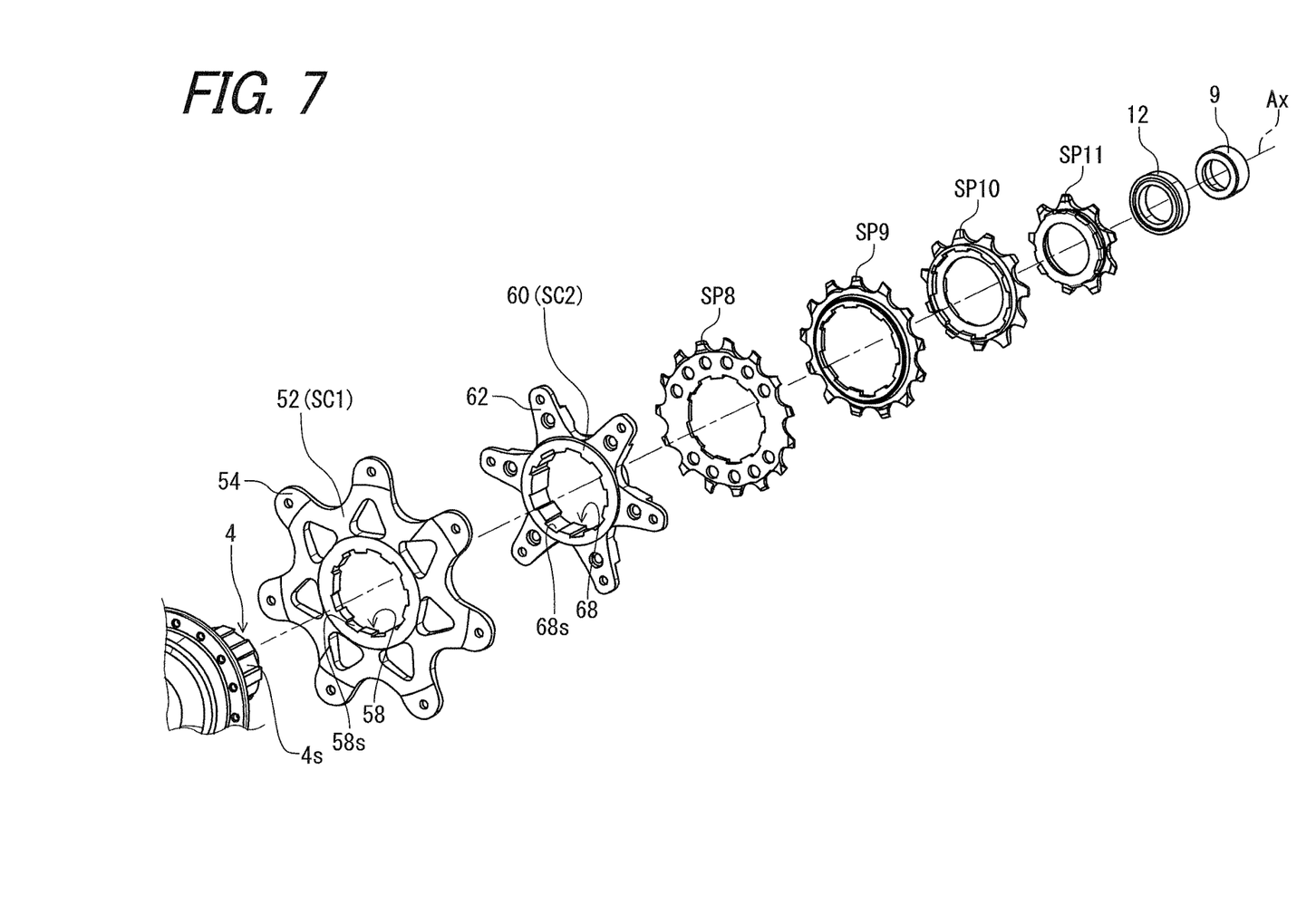
FIG. 7 is an exploded perspective view of a part of the bicycle rear sprocket assembly illustrated in FIG. 1.

As seen in FIGS. 2, 6, and 7, the bicycle rear sprocket assembly 10 further comprises a sprocket carrier SC1 or SC2. In the illustrated embodiment, the bicycle rear sprocket assembly 10 further comprises the first sprocket carrier SC1 and the second sprocket carrier SC2, but at least one of the first sprocket carrier SC1 and the second sprocket carrier SC2 can be omitted in this embodiment. In the following description, the first sprocket carrier SC1 can be referred to as a first sprocket carrier 52, and the second sprocket carrier SC2 can be referred to as a second sprocket carrier 60.

As seen in FIGS. 6 and 7, the first sprocket carrier 52 includes at least one sprocket mounting portion 54, 56 and a fifth torque-transmitting structure 58. In the illustrated embodiment, the first sprocket carrier 52 includes a first sprocket mounting portion 54 and a second sprocket mounting portion 56. That is, the at least one sprocket mounting portion 54, 56 includes a plurality of sprocket mounting portions 54 and 56. The bicycle rear sprocket assembly 10 further comprises at least one additional sprocket SP1, SP2 mounted to the at least one sprocket mounting portion 54, 56, respectively. That is, the at least one additional sprocket SP1, SP2 includes a plurality of additional sprockets SP1 and SP2 each of which is mounted to each of the plurality of sprocket mounting portions 54 and 56. The fifth torque-transmitting structure 58 includes a fifth splined portion 58s. The fifth splined portion 58s can engage with the torque-transmitting structure 4s of the sprocket support portion 4. That is, the fifth torque-transmitting structure 58 is configured to transmit the pedaling torque to the sprocket support portion 4 of the bicycle rear hub assembly 1 in the state where the bicycle rear sprocket assembly 10 is mounted to the bicycle rear hub assembly 1.

As seen in FIGS. 6 and 7, the second sprocket carrier 60 includes at least one sprocket mounting portion 62, 64, 66 and a fifth torque-transmitting structure 68. In the illustrated embodiment, the second sprocket carrier 60 includes a third sprocket mounting portion 62, a fourth sprocket mounting portion 64, and a fifth sprocket mounting portion 66. That is, the at least one sprocket mounting portion 62, 64, 66 includes a plurality of sprocket mounting portions 62, 64 and 66. The bicycle rear sprocket assembly 10 further comprises at least one additional sprocket SP3, SP4, SP5 mounted to the at least one sprocket mounting portion 62, 64, 66, respectively. That is, the at least one additional sprocket SP3, SP4, SP5 includes a plurality of additional sprockets SP3, SP4, and SP5 each of which is mounted to each of the plurality of sprocket mounting portions 62, 64 and 66. The fifth torque-transmitting structure 68 includes a fifth splined portion 68s. The fifth splined portion 68s can engage with the torque-transmitting structure 4s of the sprocket support portion 4. That is, the fifth torque-transmitting structure 68 is configured to transmit the pedaling torque to the sprocket support portion 4 of the bicycle rear hub assembly 1 in the state where the bicycle rear sprocket assembly 10 is mounted to the bicycle rear hub assembly 1.

The bicycle rear sprocket assembly 10 includes the following features.

(1) The bicycle rear sprocket assembly 10 comprises the first sprocket 14. The first sprocket 14 has the first bicycle inbound facing surface 16 and the first bicycle outbound facing surface 18 opposite to the first bicycle inbound facing surface 16 in the axial direction Da. The first sprocket 14 includes the first sprocket body 14b, the plurality of first sprocket teeth 14t, the bearing unit mounting section 24, and the first torque-transmitting structure 20. The plurality of first sprocket teeth 14t extend radially outwardly from the first radially outer periphery 14op of the first sprocket body 14b with respect to the rotational center axis Ax. The bearing unit mounting section 24 is at least partly provided to the first radially inner periphery 14ip of the first sprocket body 14b. The first torque-transmitting structure 20 is configured to transmit pedaling torque to the second sprocket 26 separately disposed adjacent to the first sprocket 14 without another sprocket between the first sprocket 14 and the second sprocket 26. The first torque-transmitting structure 20 is provided to the first bicycle inbound facing surface 16 and is a separate member from the second sprocket 26. Accordingly, it is possible to mount the first sprocket 14, which is a radially small sprocket having less than or equal to ten teeth, to the bicycle rear hub assembly 1. Therefore, a bicycle to which the bicycle rear sprocket assembly 10 is mounted can have a wide range of gear ratio.

(2) The bicycle rear sprocket assembly 10 further comprises the bearing unit 12 disposed in the bearing unit mounting section 24. The bearing unit mounting section 24 is provided radially inwardly from the first sprocket body 14b and the spacer portion 22.

(3) The first torque-transmitting structure 20 extends in the axial direction Da from the first sprocket body 14b of the first sprocket 14.

(4) The first torque-transmitting structure 20 is configured to transmit the pedaling torque to the second torque-transmitting structure 32 of the second sprocket 26 in the state where the bicycle rear sprocket assembly 10 is mounted to the bicycle rear hub assembly 1.

(5) The first torque-transmitting structure 20 includes the first splined portion 20s. The second torque-transmitting structure 32 includes the second splined portion 32s configured to engage with the first splined portion 20s in the state where the bicycle rear sprocket assembly 10 is mounted to the bicycle rear hub assembly 1.

(6) The first torque-transmitting structure 20 is integrally formed with the first sprocket body 14b as a one-piece unitary member.

(7) The first torque-transmitting structure 20 includes the spacer portion 22 configured to define the axial gap P1 between the first sprocket 14 and the second sprocket 26 in the axial direction Da in the state where the bicycle rear sprocket assembly 10 is mounted to the bicycle rear hub assembly 1.

(8) The spacer portion 22 is disposed between the first splined portion 20s and the first sprocket body 14b in the axial direction Da.

(9) The first sprocket 14 has the first total tooth number that is equal to or smaller than ten.

(10) The bicycle rear sprocket assembly 10 further comprises the second sprocket 26. The second sprocket 26 has the second bicycle inbound facing surface 28 and the second bicycle outbound facing surface 30 opposite to the second bicycle inbound facing surface 28 in the axial direction Da. The second sprocket 26 includes the second sprocket body 26b, the plurality of second sprocket teeth 26t, and the second torque-transmitting structure 32. The plurality of second sprocket teeth 26t extend radially outwardly from the second radially outer periphery 26op of the second sprocket body 26b with respect to the rotational center axis Ax. The second torque-transmitting structure 32 is provided to the second bicycle outbound facing surface 30. The first torque-transmitting structure 20 is configured to transmit the pedaling torque to the second torque-transmitting structure 32 in the state where the bicycle rear sprocket assembly 10 is mounted to the bicycle rear hub assembly 1.

(11) The second sprocket 26 includes the additional torque-transmitting structure 34 provided to the second bicycle inbound facing surface 28. The additional torque-transmitting structure 34 is configured to transmit the pedaling torque to the sprocket support portion 4 of the bicycle rear hub assembly 1 in the state where the bicycle rear sprocket assembly 10 is mounted to the bicycle rear hub assembly 1.

(12) The bicycle rear sprocket assembly 10 further comprises the third sprocket 36. The third sprocket 36 has the third bicycle inbound facing surface 38 and the third bicycle outbound facing surface 40 opposite to the third bicycle inbound facing surface 38 in the axial direction Da. The third sprocket 36 includes the third sprocket body 36b, the plurality of third sprocket teeth 36t, and the third torque-transmitting structure 42. The plurality of third sprocket teeth 36t extend radially outwardly from the third radially outer periphery 36op of the third sprocket body 36b with respect to the rotational center axis Ax. The third torque-transmitting structure 42 is configured to transmit the pedaling torque to the sprocket support portion 4 of the bicycle rear hub assembly 1 in the state where the bicycle rear sprocket assembly 10 is mounted to the bicycle rear hub assembly 1. The third sprocket 36 is separately disposed adjacent to the second sprocket 26 without another sprocket between the second sprocket 26 and the third sprocket 36 so that the third bicycle outbound facing surface 40 of the third sprocket 36 faces the second bicycle inbound facing surface 28 of the second sprocket 26 in the axial direction Da in the state where the bicycle rear sprocket assembly 10 is mounted to the bicycle rear hub assembly 1.

(13) The bicycle rear sprocket assembly 10 further comprises the fourth sprocket 44. The fourth sprocket 44 has the fourth bicycle inbound facing surface 46 and the fourth bicycle outbound facing surface 48 opposite to the fourth bicycle inbound facing surface 46 in the axial direction Da. The fourth sprocket 44 includes the fourth sprocket body 44b, the plurality of fourth sprocket teeth 44t, and the fourth torque-transmitting structure 50. The plurality of fourth sprocket teeth 44t extend radially outwardly from the fourth radially outer periphery 44op of the fourth sprocket body 44b with respect to the rotational center axis Ax. The fourth torque-transmitting structure 50 is configured to transmit the pedaling torque to the sprocket support portion 4 of the bicycle rear hub assembly 1 in the state where the bicycle rear sprocket assembly 10 is mounted to the bicycle rear hub assembly 1. The fourth sprocket 44 is separately disposed adjacent to the third sprocket 36 without another sprocket between the third sprocket 36 and the fourth sprocket 44 so that the fourth bicycle outbound facing surface 48 of the fourth sprocket 44 faces the third bicycle inbound facing surface 38 of the third sprocket 36 in the axial direction Da in the state where the bicycle rear sprocket assembly 10 is mounted to the bicycle rear hub assembly 1.

(14) The bicycle rear sprocket assembly 10 further comprises the sprocket carrier 52, 60 and the at least one additional sprocket SP1 to SP5. The sprocket carrier 52, 60 includes the at least one sprocket mounting portion 54, 56, 62, 64, and 66, and the fifth torque-transmitting structure 58, 68 configured to transmit the pedaling torque to the sprocket support portion 4 of the bicycle rear hub assembly 1 in the state where the bicycle rear sprocket assembly 10 is mounted to the bicycle rear hub assembly 1. The at least one additional sprocket SP1 to SP5 is mounted to the at least one sprocket mounting portion 54, 56, 62, 64, and 66.

(15) The at least one sprocket mounting portion 54, 56, 62, 64, and 66 includes the plurality of sprocket mounting portions 54, 56, 62, 64, and 66. The at least one additional sprocket SP1 to SP5 includes the plurality of additional sprockets SP1 to SP5 each of which is mounted to each of the plurality of sprocket mounting portions 54, 56, 62, 64, and 66.

(16) The third torque-transmitting structure 42 includes the third splined portion 42s.

(17) The fourth torque-transmitting structure 50 includes the fourth splined portion 50s.

(18) The fifth torque-transmitting structure 58, 68 includes the fifth splined portion 58s, 68s.

Second Embodiment

A bicycle rear hub assembly 201 and a bicycle rear sprocket assembly 210 in accordance with a second embodiment will be described below referring to FIG. 8. The bicycle rear hub assembly 201 has substantially the same structures as those of the bicycle rear hub assembly 1 except for the sprocket support portion 4. The bicycle rear sprocket assembly 210 has substantially the same structures as those of the bicycle rear sprocket assembly 10 except for the second sprocket 26. Thus, elements having substantially the same function as those in the first embodiment will be numbered the same here, and will not be described and/or illustrated again in detail here for the sake of brevity.

Figure 8:
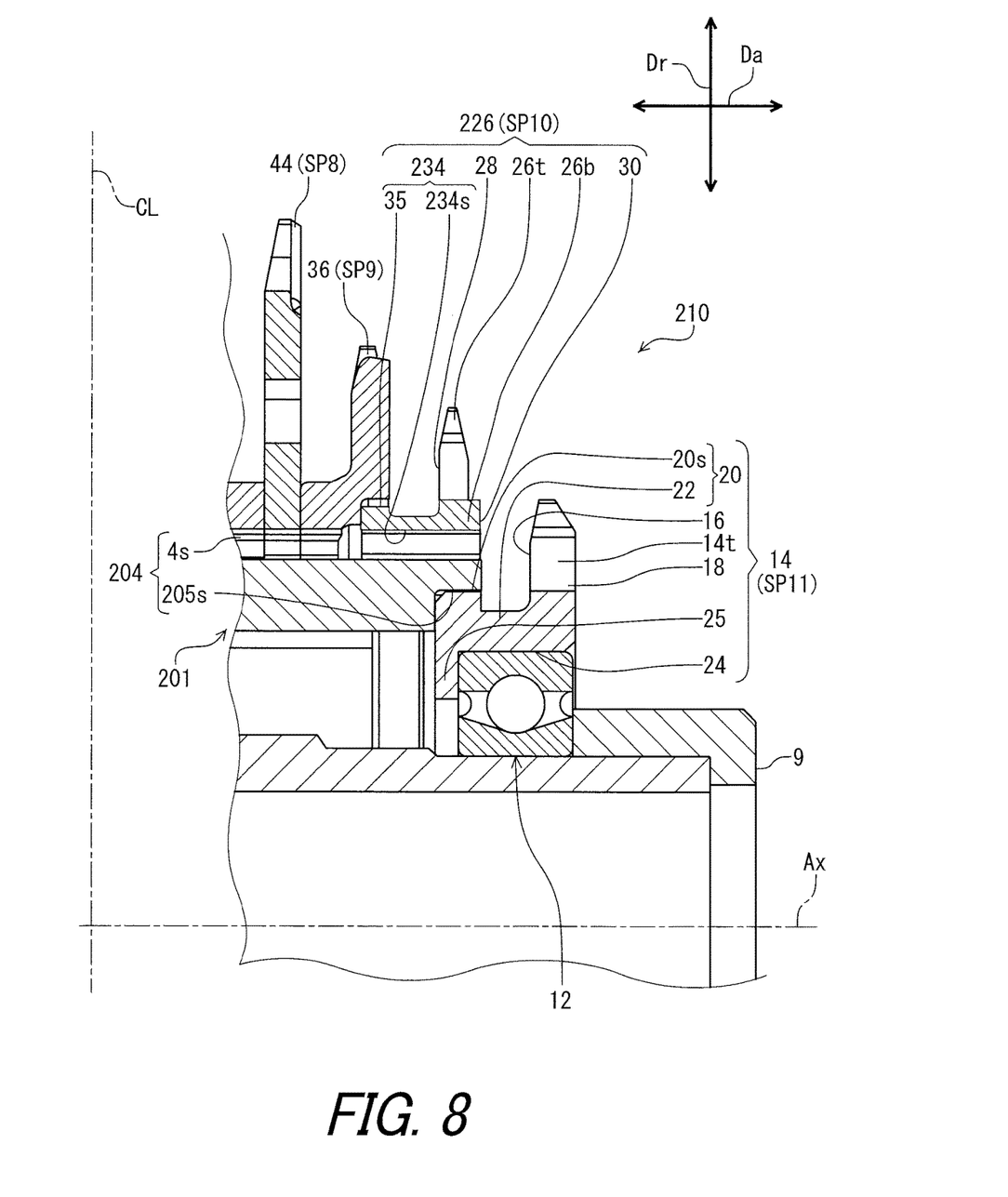
FIG. 8 is an enlarged partially cross-sectional view of a part P of the bicycle rear sprocket assembly in accordance with a second embodiment.

As seen in FIG. 8, the bicycle rear hub assembly 201 comprises a sprocket support portion 204 in place of the sprocket support portion 4 in the first embodiment. The bicycle rear sprocket assembly 210 comprises a second sprocket 226 in place of the second sprocket 26 in the first embodiment. In addition to the torque-transmitting structure 4s in the first embodiment, the sprocket support portion 204 further includes an inner torque-transmitting structure 205s on a radially inner peripheral surface of the sprocket support portion 204. The inner torque-transmitting structure 205s is opposite to the torque-transmitting structure 4s in the radial direction Dr. The inner torque-transmitting structure 205s includes a splined portion to be engaged with the first splined portion 20s of the first sprocket 14. The second sprocket 226 doesn't include the second torque-transmitting structure 32 or the second radially inward protruding portion 33. The second sprocket 226 includes an additional torque-transmitting structure 234 including the outward protruding portion 35 described in the first embodiment and an additional splined portion 234s. The additional splined portion 234s is longer than the additional splined portion 34s in the first embodiment. The additional splined portion 234s reaches the second bicycle outbound facing surface 30. In this embodiment, the first torque-transmitting structure 20 of the first sprocket 14 is configured to indirectly transmit the pedaling torque to the second sprocket 226. Specifically, the first torque-transmitting structure 20 of the first sprocket 14 is configured to transmit the pedaling torque to the second sprocket 226 via the sprocket support portion 204.

With the bicycle rear sprocket assembly 210, it is possible to obtain substantially the same effects as those of the bicycle rear sprocket assembly 10 in accordance with the first embodiment.

It will be apparent to those skilled in the bicycle field from the present disclosure that the structures and/or configurations of the above embodiments can be at least partly combined with each other.

In the above embodiment, the sprocket SP11 or 14 is referred to as the first sprocket, but it can be simply referred to as a bicycle rear sprocket SP11 or 14. In the same manner, the first bicycle inbound facing surface 16, the first bicycle outbound facing surface 18, the first sprocket body 14b, the plurality of first sprocket teeth 14t, the first radially outer periphery 14op, the first radially inner periphery 14ip, the first torque-transmitting structure 20, the first splined portion 20s, the first radially inward protruding portion 25 can be simply referred to as a bicycle inbound facing surface 16, a bicycle outbound facing surface 18, a sprocket body 14b, a plurality of sprocket teeth 14t, a radially outer periphery 14op, a radially inner periphery 14ip, a torque-transmitting structure 20, a splined portion 20s, a radially inward protruding portion 25, respectively. In this case, the second sprocket SP10 or 26 can be referred to as a neighbor rear sprocket SP10 or 26.

Accordingly, the bicycle rear sprocket 14 has the bicycle inbound facing surface 16 and the bicycle outbound facing surface 18 opposite to the bicycle inbound facing surface 16 in the axial direction Da parallel to the rotational center axis Ax of the bicycle rear sprocket 14. The bicycle rear sprocket 14 includes the sprocket body 14b, the plurality of sprocket teeth 14t, the bearing unit mounting section 24, and the torque-transmitting structure 20. The plurality of sprocket teeth 14t extends radially outwardly from the radially outer periphery 14op of the sprocket body 14b with respect to the rotational center axis Ax. The bearing unit mounting section 24 is at least partly provided to the radially inner periphery 14ip of the sprocket body 14b. The torque-transmitting structure 20 is configured to transmit the pedaling torque to the neighbor rear sprocket 26 separately disposed adjacent to the bicycle rear sprocket 14 without another sprocket between the bicycle rear sprocket 14 and the neighbor rear sprocket 26. The torque-transmitting structure 20 is provided to the bicycle inbound facing surface 16 and is a separate member from the neighbor rear sprocket 26.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle rear sprocket assembly comprising:
   a first sprocket having a first bicycle inbound facing surface and a first bicycle outbound facing surface opposite to the first bicycle inbound facing surface in an axial direction parallel to a rotational center axis of the bicycle rear sprocket assembly, the first sprocket including:
   a first sprocket body,
   a plurality of first sprocket teeth extending radially outwardly from a first radially outer periphery of the first sprocket body with respect to the rotational center axis,
   a bearing unit mounting section at least partly provided to a first radially inner periphery of the first sprocket body, and
   a first torque-transmitting structure configured to transmit pedaling torque to a second sprocket separately disposed adjacent to the first sprocket without another sprocket between the first sprocket and the second sprocket, the first torque-transmitting structure being provided to the first bicycle inbound facing surface and being a separate member from the second sprocket.

2. The bicycle rear sprocket assembly according to claim 1, further comprising:
   a bearing unit disposed in the bearing unit mounting section.

3. The bicycle rear sprocket assembly according to claim 1, wherein
   the first torque-transmitting structure extends in the axial direction from the first sprocket body of the first sprocket.

4. The bicycle rear sprocket assembly according to claim 1, wherein
   the first torque-transmitting structure is configured to transmit the pedaling torque to a second torque-transmitting structure of the second sprocket in a state where the bicycle rear sprocket assembly is mounted to a bicycle rear hub assembly.

5. The bicycle rear sprocket assembly according to claim 4, wherein
   the first torque-transmitting structure includes a first splined portion, and
   the second torque-transmitting structure includes a second splined portion configured to engage with the first splined portion in the state where the bicycle rear sprocket assembly is mounted to the bicycle rear hub assembly.

6. The bicycle rear sprocket assembly according to claim 1, wherein
   the first torque-transmitting structure is integrally formed with the first sprocket body as a one-piece unitary member.

7. The bicycle rear sprocket assembly according to claim 1, wherein
   the first torque-transmitting structure includes a spacer portion configured to define an axial gap between the first sprocket and the second sprocket in the axial direction in a state where the bicycle rear sprocket assembly is mounted to a bicycle rear hub assembly.

8. The bicycle rear sprocket assembly according to claim 7, wherein
   the first torque-transmitting structure includes a first splined portion; and
   the second sprocket includes a second torque-transmitting structure including a second splined portion configured to engage with the first splined portion in the state where the bicycle rear sprocket assembly is mounted to the bicycle rear hub assembly.

9. The bicycle rear sprocket assembly according to claim 8, wherein
   the spacer portion is disposed between the first splined portion and the first sprocket body in the axial direction.

10. The bicycle rear sprocket assembly according to claim 7, further comprising:
    a bearing unit disposed in the bearing unit mounting section provided radially inwardly from the first sprocket body and the spacer portion.

11. The bicycle rear sprocket assembly according to claim 1, wherein
    the first sprocket has a first total tooth number that is equal to or smaller than ten.

12. The bicycle rear sprocket assembly according to claim 1, further comprising:

the second sprocket having a second bicycle inbound facing surface and a second bicycle outbound facing surface opposite to the second bicycle inbound facing surface in the axial direction, the second sprocket including
a second sprocket body,
a plurality of second sprocket teeth extending radially outwardly from a second radially outer periphery of the second sprocket body with respect to the rotational center axis, and
a second torque-transmitting structure provided to the second bicycle outbound facing surface, the first torque-transmitting structure being configured to transmit the pedaling torque to the second torque-transmitting structure in a state where the bicycle rear sprocket assembly is mounted to a bicycle rear hub assembly.

13. The bicycle rear sprocket assembly according to claim 12, wherein
the second sprocket includes an additional torque-transmitting structure provided to the second bicycle inbound facing surface; and
the additional torque-transmitting structure is configured to transmit the pedaling torque to a sprocket support portion of the bicycle rear hub assembly in the state where the bicycle rear sprocket assembly is mounted to the bicycle rear hub assembly.

14. The bicycle rear sprocket assembly according to claim 13, further comprising:
a third sprocket having a third bicycle inbound facing surface and a third bicycle outbound facing surface opposite to the third bicycle inbound facing surface in the axial direction, the third sprocket including
a third sprocket body,
a plurality of third sprocket teeth extending radially outwardly from a third radially outer periphery of the third sprocket body with respect to the rotational center axis, and
a third torque-transmitting structure configured to transmit the pedaling torque to the sprocket support portion of the bicycle rear hub assembly in the state where the bicycle rear sprocket assembly is mounted to the bicycle rear hub assembly,
the third sprocket being separately disposed adjacent to the second sprocket without another sprocket between the second sprocket and the third sprocket so that the third bicycle outbound facing surface of the third sprocket faces the second bicycle inbound facing surface of the second sprocket in the axial direction in the state where the bicycle rear sprocket assembly is mounted to the bicycle rear hub assembly.

15. The bicycle rear sprocket assembly according to claim 14, further comprising:
a fourth sprocket having a fourth bicycle inbound facing surface and a fourth bicycle outbound facing surface opposite to the fourth bicycle inbound facing surface in the axial direction, the fourth sprocket including
a fourth sprocket body,
a plurality of fourth sprocket teeth extending radially outwardly from a fourth radially outer periphery of the fourth sprocket body with respect to the rotational center axis, and
a fourth torque-transmitting structure configured to transmit the pedaling torque to the sprocket support portion of the bicycle rear hub assembly in the state where the bicycle rear sprocket assembly is mounted to the bicycle rear hub assembly,
the fourth sprocket being separately disposed adjacent to the third sprocket without another sprocket between the third sprocket and the fourth sprocket so that the fourth bicycle outbound facing surface of the fourth sprocket faces the third bicycle inbound facing surface of the third sprocket in the axial direction in the state where the bicycle rear sprocket assembly is mounted to the bicycle rear hub assembly.

16. The bicycle rear sprocket assembly according to claim 13, further comprising:
a sprocket carrier including at least one sprocket mounting portion and a fifth torque-transmitting structure configured to transmit the pedaling torque to the sprocket support portion of the bicycle rear hub assembly in the state where the bicycle rear sprocket assembly is mounted to the bicycle rear hub assembly; and
at least one additional sprocket mounted to the at least one sprocket mounting portion.

17. The bicycle rear sprocket assembly according to claim 16, wherein
the at least one sprocket mounting portion includes a plurality of sprocket mounting portions; and
the at least one additional sprocket includes a plurality additional sprockets each of which is mounted to each of the plurality of sprocket mounting portions.

18. The bicycle rear sprocket assembly according to claim 14, wherein
the third torque-transmitting structure includes a third splined portion.

19. The bicycle rear sprocket assembly according to claim 15, wherein
the fourth torque-transmitting structure includes a fourth splined portion.

20. The bicycle rear sprocket assembly according to claim 16, wherein
the fifth torque-transmitting structure includes a fifth splined portion.

21. A bicycle rear sprocket having a bicycle inbound facing surface and a bicycle outbound facing surface opposite to the bicycle inbound facing surface in an axial direction parallel to a rotational center axis of the bicycle rear sprocket, the bicycle rear sprocket including
a sprocket body,
a plurality of sprocket teeth extending radially outwardly from a radially outer periphery of the sprocket body with respect to the rotational center axis,
a bearing unit mounting section at least partly provided to a radially inner periphery of the sprocket body, and
a torque-transmitting structure configured to transmit pedaling torque to a neighbor rear sprocket separately disposed adjacent to the bicycle rear sprocket without another sprocket between the bicycle rear sprocket and the neighbor rear sprocket,
the torque-transmitting structure being provided to the bicycle inbound facing surface and being a separate member from the neighbor rear sprocket.

* * * * *